(12) United States Patent
Yang et al.

(10) Patent No.: US 11,602,128 B2
(45) Date of Patent: Mar. 14, 2023

(54) EAR TAG MODULE

(71) Applicant: Industrial Technology Research Institute, Hsinchu (TW)

(72) Inventors: Shu-Jung Yang, Tainan (TW); Yu-Lin Chao, Hsinchu (TW); Chih-Chung Chiu, Miaoli County (TW); Heng-Chieh Chien, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 335 days.

(21) Appl. No.: 16/885,250

(22) Filed: May 27, 2020

(65) Prior Publication Data

US 2020/0383298 A1    Dec. 10, 2020

(30) Foreign Application Priority Data

May 31, 2019   (TW) ................................. 108206947

(51) Int. Cl.
| | |
|---|---|
| *A01K 11/00* | (2006.01) |
| *A01K 29/00* | (2006.01) |
| *G01J 5/00* | (2022.01) |
| *G01K 7/00* | (2006.01) |
| *G01K 13/20* | (2021.01) |

(52) U.S. Cl.
CPC ............ *A01K 11/004* (2013.01); *A01K 29/00* (2013.01); *G01J 5/0025* (2013.01); *G01K 7/00* (2013.01); *G01K 13/20* (2021.01)

(58) Field of Classification Search
CPC ..... A01K 11/004; A01K 29/00; G01J 5/0025; G01J 5/04; G01K 7/00; G01K 13/20
See application file for complete search history.

(56) References Cited

U.S. PATENT DOCUMENTS 9,848,577 B1 * 12/2017 Brandao .............. A01K 11/004
10,045,511 B1    8/2018 Yarden et al.
(Continued)

FOREIGN PATENT DOCUMENTS

| CN | 204363964 U | * | 6/2015 |
| CN | 205646969 U | * | 10/2016 |
| CN | 106912396 | | 7/2017 |

(Continued)

OTHER PUBLICATIONS

Suresh Neethirajan, "Recent advances in wearable sensors for animal health management," Sensing and Bio-Sensing Research, vol. 12, Feb. 2017, pp. 15-29.

(Continued)

*Primary Examiner* — Lisa M Caputo
*Assistant Examiner* — Janice M Soto
(74) *Attorney, Agent, or Firm* — JCIPRNET

(57) ABSTRACT

An ear tag module includes a rod member, a spike, a circuit component, and a temperature sensor. The spike is disposed on one side of the rod member, and the circuit component is disposed on another side of the rod member. The temperature sensor is electrically connected to the circuit component. When the spike penetrates an ear, the ear is in contact with a sensing area of the rod member, and the temperature sensor is located in the rod member to detect a temperature of the ear and transmit at least one temperature sensing information to the circuit component.

10 Claims, 7 Drawing Sheets

(56) References Cited

U.S. PATENT DOCUMENTS

2017/0156288 A1* 6/2017 Singh .................. A01K 11/002
2019/0059336 A1* 2/2019 Robbins ................ A61B 5/01

FOREIGN PATENT DOCUMENTS

| CN | 106912396 A | * | 7/2017 | | |
|---|---|---|---|---|---|
| CN | 207412150 U | * | 5/2018 | | |
| JP | 2004298020 A | * | 10/2004 | | |
| WO | WO-2016181604 A1 | * | 11/2016 | ........... | A01K 11/004 |

OTHER PUBLICATIONS

James Foulkes et al., "Livestock Management System," International Conference on Embedded Systems and Applications, Jul. 2013, pp. 3-9.

Y. Lee et al., "Body Temperature Monitoring Using Subcutaneously Implanted Thermo-loggers from Holstein Steers," Asian-Australas J Anim Sci, vol. 29, No. 2, Sep. 2015, pp. 299-306.

Ousmane Dieng et al., "A Study on IoT Solutions for Preventing Cattle Rustling in African Context," ICC '17 Proceedings of the Second International Conference on Internet of things, Data and Cloud Computing, Article No. 153, Mar. 2017, pp. 1-13.

* cited by examiner

EAR TAG MODULE

CROSS-REFERENCE TO RELATED APPLICATION

This application claims the priority benefit of Taiwan application serial no. 108206947, filed on May 31, 2019. The entirety of the above-mentioned patent application is hereby incorporated by reference herein and made a part of this specification.

TECHNICAL FIELD

The disclosure relates to an ear tag module.

BACKGROUND

Traditional livestock (such as cows, sheep, pigs, etc.) are raised manually, and often require special care, so the labor cost is relatively high. At present, if positioning and tracking are done via a GPS with a wide range, issues such as high cost, small capacity, insufficient endurance, etc. occur, and real-time individual livestock health is difficult to manage, and is therefore not conducive to livestock growth history and scientific management. Furthermore, in recent years, swine fever, foot-and-mouth disease, etc. have often caused great losses in animal husbandry. Therefore, ear tags are one of the most commonly used items for livestock identification and traceability management.

However, at present, ear tags are mainly based on labels or barcodes, and most of the penetrating rods thereof are plastic parts that cannot directly and accurately transmit physiological information such as body temperature of livestock to a sensor, and therefore the ear temperature of livestock may not be directly and accurately sensed. That is to say, the current ear tag mainly obtains the temperature of the livestock via an indirect method, and feedback on physiological state may not be continuously and instantly provided.

SUMMARY

The disclosure provides an ear tag module including a rod member, a spike, a circuit component, and a temperature sensor. The spike is disposed on one side of the rod member, and the circuit component is disposed on another side of the rod member. The temperature sensor is electrically connected to the circuit component. When the spike penetrates an ear, the ear is in contact with a sensing area of the rod member, and the temperature sensor is located in the rod member to detect a temperature of the ear and transmit at least one temperature sensing information to the circuit component.

Several exemplary embodiments accompanied with figures are described in detail below to further describe the disclosure in details.

DETAILED DESCRIPTION OF DISCLOSED EMBODIMENTS

Figure 1A:
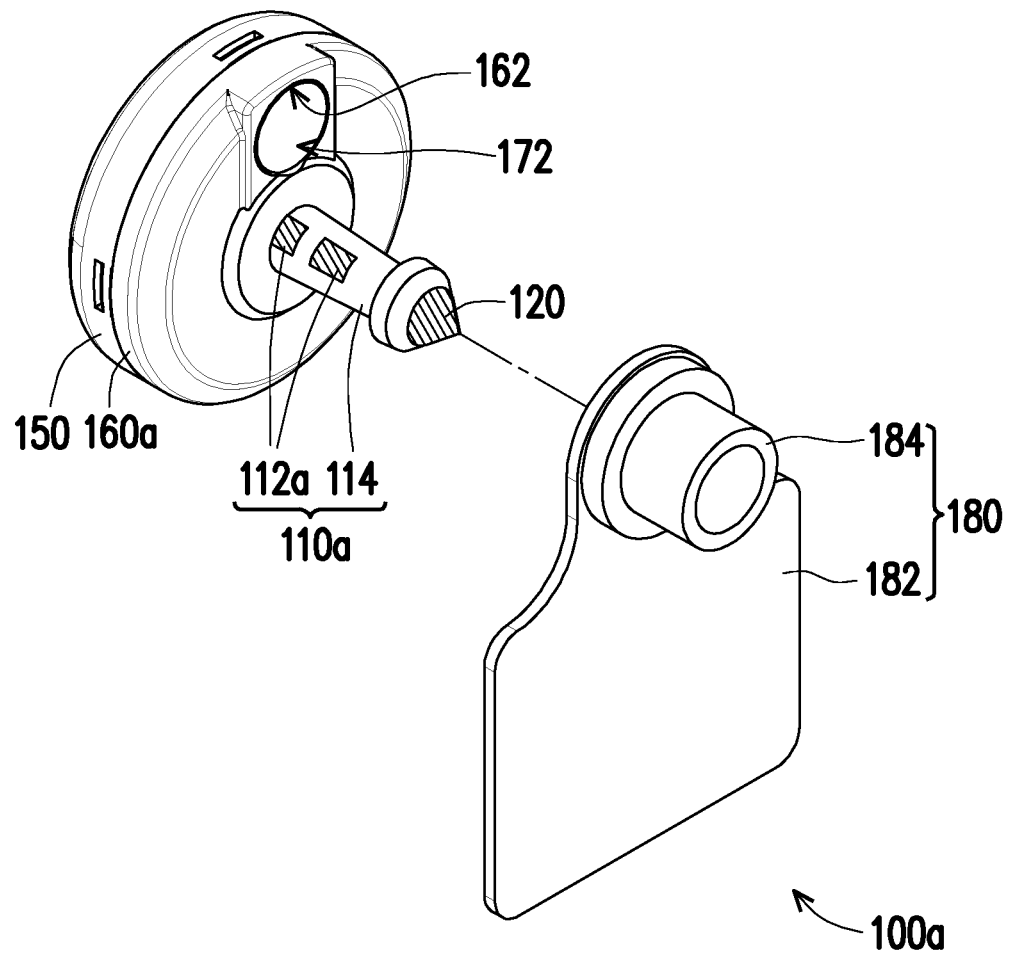
FIG. 1A shows a perspective view of an ear tag module of an embodiment of the disclosure.
Figure 1B:
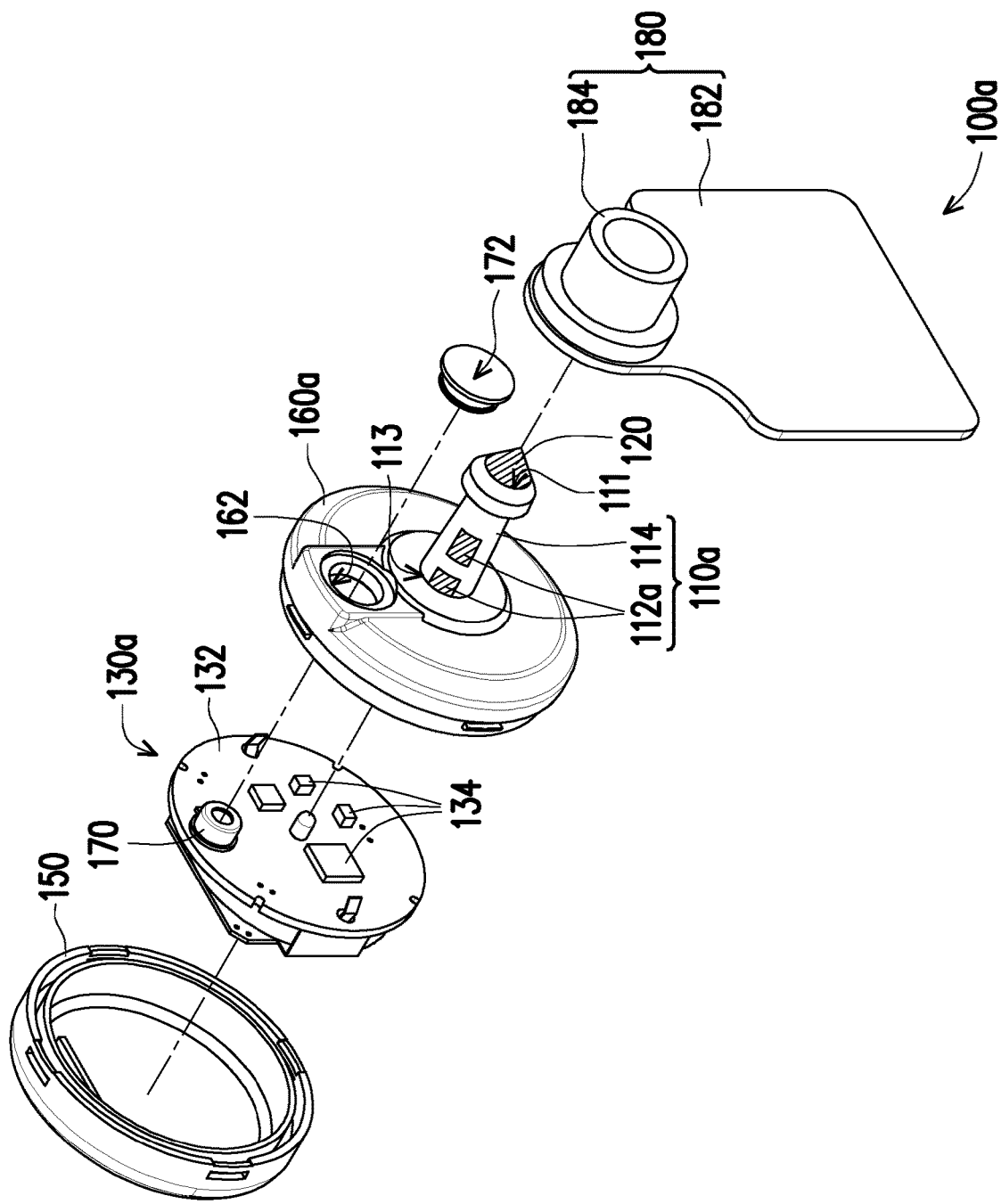
FIG. 1B shows an exploded perspective view of the ear tag module of FIG. 1A.
Figure 1C:
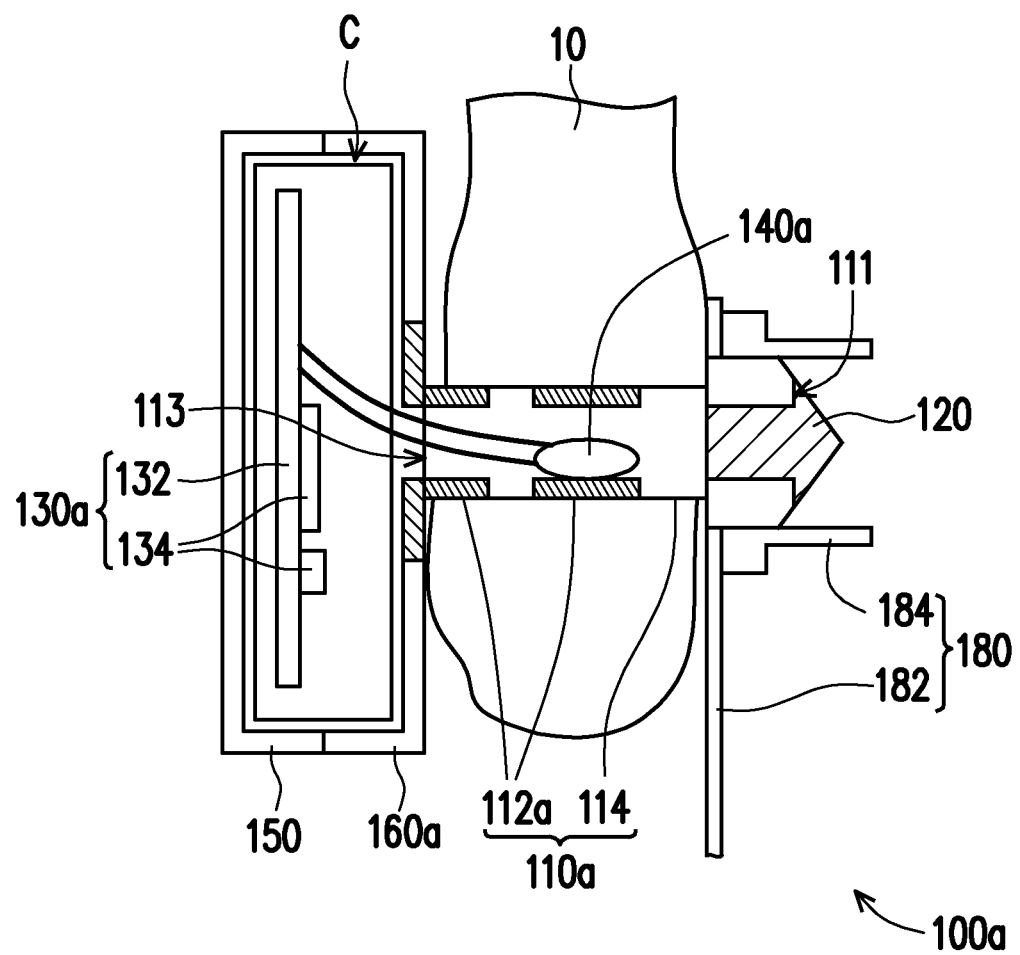
FIG. 1C shows a cross-sectional view of the ear tag module of FIG. 1A penetrating an ear.

FIG. 1A shows a perspective view of an ear tag module of an embodiment of the disclosure. FIG. 1B shows an exploded perspective view of the ear tag module of FIG. 1A. FIG. 1C shows a cross-sectional view of the ear tag module of FIG. 1A penetrating an ear.

Please refer to FIG. 1A, FIG. 1B, and FIG. 1C at the same time. In the present embodiment, an ear tag module 100*a* includes a rod member 110*a*, a spike 120, a circuit component 130*a*, and a temperature sensor 140*a*. The rod member 110*a* includes at least one first housing portion (schematically showing a plurality of first housing portions 112*a*) and a second housing portion 114 connected to the first housing portions 112*a*. The spike 120 is disposed on one side 111 of the rod member 110*a*, and the circuit component 130*a* is disposed on another side 113 of the rod member 110*a*. The temperature sensor 140*a* is electrically connected to the circuit component 130*a*. When the spike 120 penetrates an ear 10, the ear 10 is in direct contact with at least the first housing portions 112*a* of the rod member 110*a*, and the temperature sensor 140*a* is located in the rod member 110*a* to detect the temperature of the ear 10 and transmit at least one temperature sensing information to the circuit component 130*a*.

In detail, the rod member 110*a* of the present embodiment is formed by two materials, wherein the plurality of first housing portions 112*a* are separated from each other, and the thermal conductivity of the first housing portions 112*a* is greater than the thermal conductivity of the second housing portion 114. In an embodiment, the total area of the first housing portions 112*a* is smaller than the total area of the second housing portion 114, so that the rod member 110*a* has better coating structure strength and lighter weight. In particular, the material of the first housing portions 112*a* and the material of the second housing portion 114 of the rod member 110*a* are both biocompatible. For example, the material of the first housing portions 112*a* is, for example, stainless steel, titanium, cobalt, or ceramic, and the material of the second housing portion 114 is, for example, thermoplastic urethane (TPU), but the disclosure is not limited thereto. The material of the spike 120 is, for example, a metal with biocompatibility, and one side of the spike 120 is embedded in one side of the rod member 110*a* and fixed on the rod member 110*a*.

The circuit component 130*a* includes a circuit board 132 and at least one electronic component (a plurality of electronic components 134 are schematically shown), and the temperature sensor 140*a* is electrically connected on the circuit board 132 of the circuit component 130*a*. Here, the electronic components 134 may be, for example, radio frequency transceivers transmitting signals, display components displaying temperature sensing data, GPS positioning components that may be located, built-in chips that may record the feeding information, etc. of livestock, and LED components used for searching livestock location, and the disclosure is not limited thereto. The circuit component 130*a* may transmit temperature sensing information to the display component in a wired or wireless manner. The temperature sensor 140a is, for example, a negative temperature coefficient (NTC) sensor, a resistance temperature sensor (RTD), a thermocouple sensor, or other suitable temperature sensors, and the disclosure is not limited thereto.

Furthermore, the ear tag module 100a of the present embodiment may further include an upper cover 150 and a lower cover 160a. The lower cover 160a is connected to the other side 113 of the rod member 110a, and is assembled with the upper cover 150 by a rotating buckle or other suitable methods to define an accommodating space C, wherein the circuit component 130a is located in the accommodating space C. It should be noted that, in an embodiment, the rod member 110a and the lower cover 160a may be integrally formed by injection molding, and the upper cover 150 may also be independently formed by injection molding, but the disclosure is not limited thereto.

Optionally, the lower cover 160a has a viewing window 162, and the ear tag module 100a may further include an auxiliary temperature sensor 170, wherein the auxiliary temperature sensor 170 is disposed in the viewing window 162 of the lower cover 160a. One end of the auxiliary temperature sensor 170 is attached in the viewing window 162 of the lower cover 160a, and the other end of the auxiliary temperature sensor 170 is electrically connected to the circuit board 132. As shown in FIG. 1A and FIG. 1B, a window 172 of the auxiliary temperature sensor 170 is exposed outside the surface of the lower cover 160a and is used as a sensing end window of the auxiliary temperature sensor 170. Here, the auxiliary temperature sensor 170 is provided to prevent the temperature sensor 140a from malfunctioning or falling off and causing measurement deviation or to correct the temperature sensor 140a. The auxiliary temperature sensor 170, for example, measures the temperature of the ear 10 of livestock in a non-contact manner, wherein the auxiliary temperature sensor 170 is, for example, an infrared temperature sensor, but the disclosure is not limited thereto.

In addition, the ear tag module 100a of the present embodiment further includes a label component 180, wherein the label component 180 may include a label portion 182 and a fixing portion 184 connected to the label portion 182. The label portion 182 may be provided with, for example, a quick response code (QR code) for scanning to obtain information on livestock. The spike 120 is adapted to pass through the fixing portion 184 of the label component 180, wherein the inner diameter of the fixing portion 184 is partly smaller than the outer diameter of the spike 120, and the spike 120 may be locked in the fixing portion 184. As shown in FIG. 1C, when the spike 120 penetrates the ear 10, the ear 10 is located between the label component 180 and the circuit component 130a, but the disclosure is not limited thereto.

In short, in the present embodiment, the first housing portions 112a of the rod member 110a having a high thermal conductivity are in direct contact with the ear 10, and the temperature sensor 140a located in the rod member 110a may more quickly and accurately detect the body temperature of livestock via the first housing portions 112a. In other words, the ear tag module 100a of the present embodiment may provide instant feedback on the physiological state of livestock, and may achieve precise livestock farming (PLF).

It should be mentioned here that, the following embodiments adopt the reference numerals of the embodiments above and a portion of the content thereof, wherein the same reference numerals are used to represent the same or similar elements and descriptions of the same technical content are omitted. The omitted portions are as described in the embodiments above and are not repeated in the embodiments below.

Figure 2:
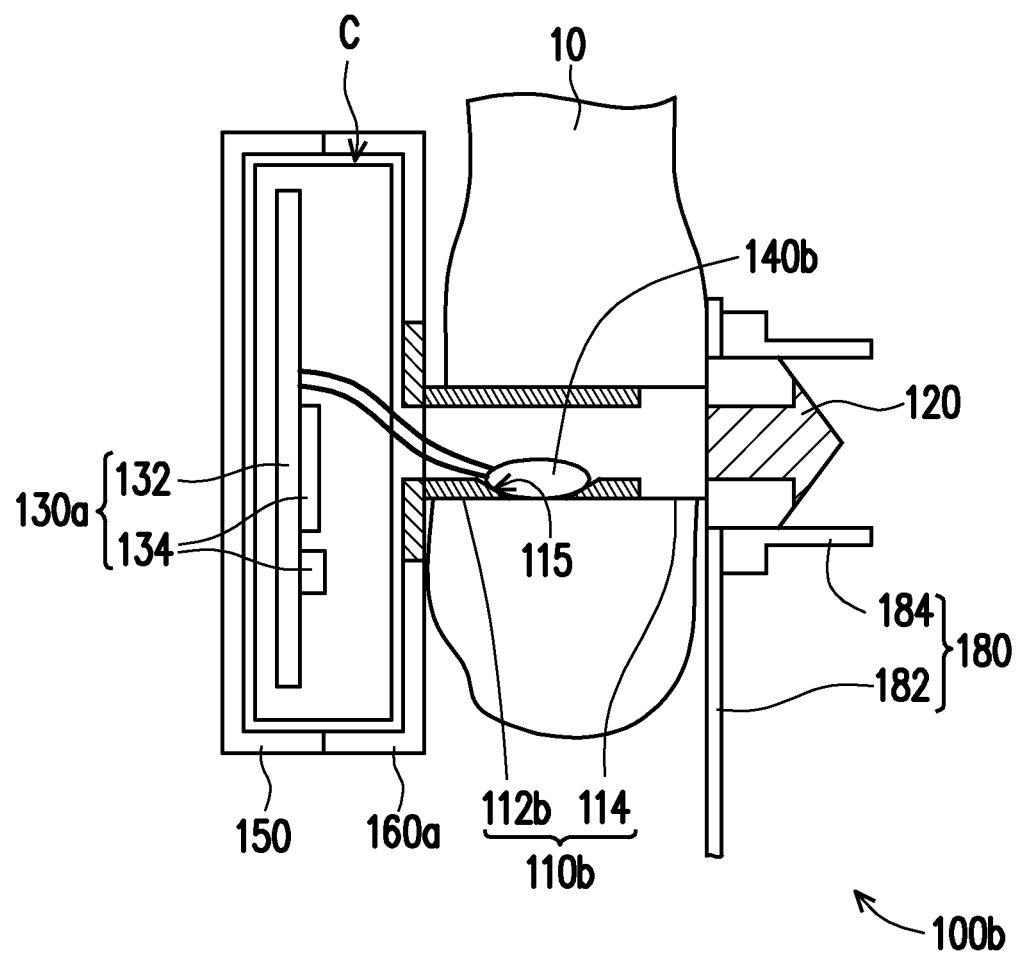
FIG. 2 is a cross-sectional view of an ear tag module penetrating an ear of an embodiment of the disclosure.

FIG. 2 is a cross-sectional view of an ear tag module penetrating an ear of an embodiment of the disclosure. Referring to FIG. 2 and FIG. 1C at the same time, an ear tag module 100b of the present embodiment is similar to the ear tag module 100a of FIG. 1C, and the difference between the two is that a first housing portion 112b of the rod member 110b of the present embodiment has an accommodating opening 115, and a temperature sensor 140b is fixed at the accommodating opening 115. When the spike 120 penetrates the ear 10, the temperature sensor 140b may be in direct contact with the ear 10 of the livestock, so that the ear tag module 100b may measure the body temperature of the livestock more accurately.

Figure 3:
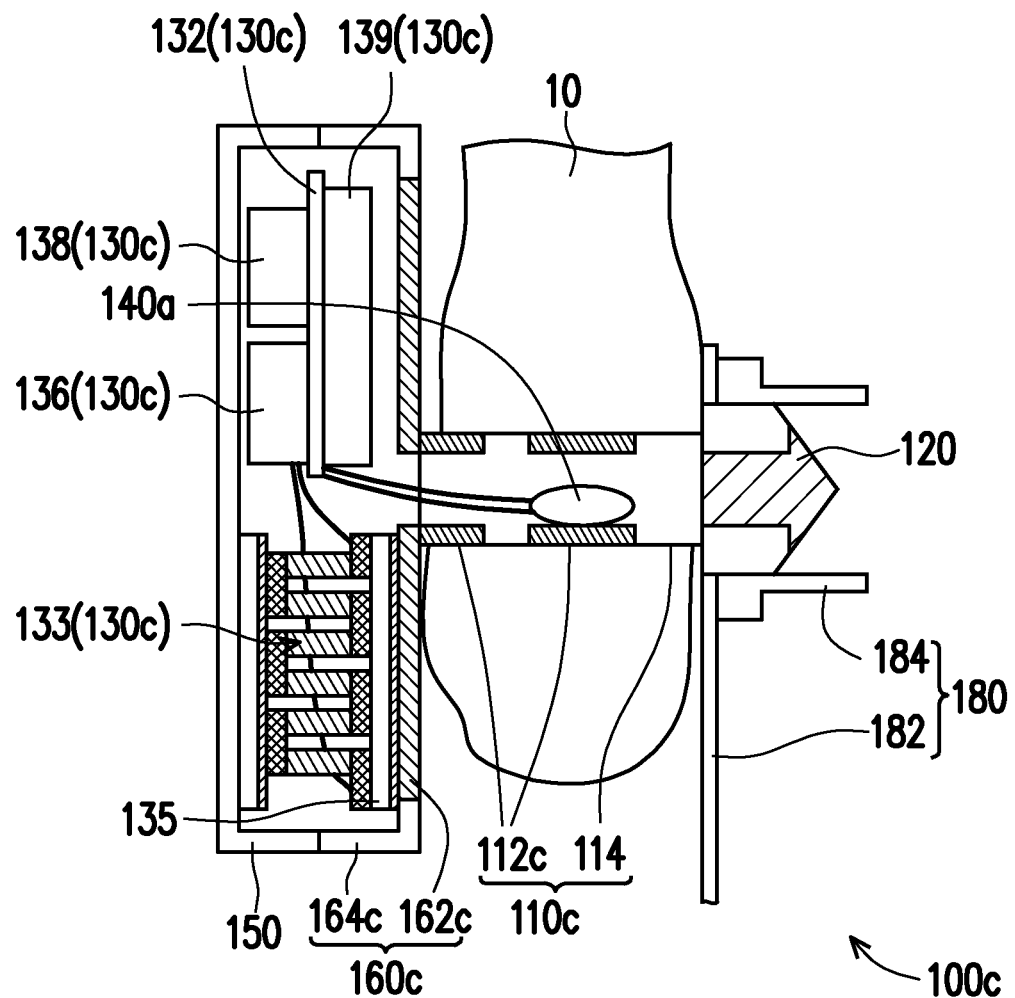
FIG. 3 is a cross-sectional view of an ear tag module penetrating an ear of another embodiment of the disclosure.

FIG. 3 is a cross-sectional view of an ear tag module penetrating an ear of another embodiment of the disclosure. Please refer to FIG. 3 and FIG. 1C at the same time. An ear tag module 100c of the present embodiment is similar to the ear tag module 100a of FIG. 1C. The difference between the two is that a lower cover 160c of the present embodiment includes a first portion 162c and a second portion 164c connected to the first portion 162c, wherein the thermal conductivity of the first portion 162c is greater than the thermal conductivity of the second portion 164c, and a first housing portion 112c of the rod member 110c is connected to the first portion 162c of the lower cover 160c. The materials of the first portion 162c and the second portion 164c are both biocompatible, wherein the material of the first portion 162c is, for example, stainless steel, titanium, cobalt, or ceramic, and the material of the second portion 164c is, for example, thermoplastic urethane (TPU), but the disclosure is not limited thereto.

Furthermore, a circuit component 130c of the present embodiment includes a thermoelectric component 133, a booster circuit 136, a super capacitor 138, a circuit board 132, and a battery 139. A ceramic layer 135 of the thermoelectric component 133 is connected to the first portion 162c of the lower cover 160c via attaching. The booster circuit 136 is electrically connected to the thermoelectric component 133, and the super capacitor 138 is electrically connected to the booster circuit 136. The circuit board 132 is electrically connected to the booster circuit 136 and the super capacitor 138, and the battery 139 is electrically connected to the circuit board 132. Body temperature power generation is performed via the temperature difference between the body temperature of livestock and the outside environment. The amount of power generated by the body temperature power generation may be converted and stored in the super capacitor 138 via the booster circuit 136 as auxiliary power of the battery 139 of the ear tag module 100c to improve the service life of the ear tag module 100c. Therefore, the ear tag module 100c is suitable for use on the ear 10 of livestock (such as breeding pigs, cattle, or sheep) that need to be farmed for many years.

Figure 4:
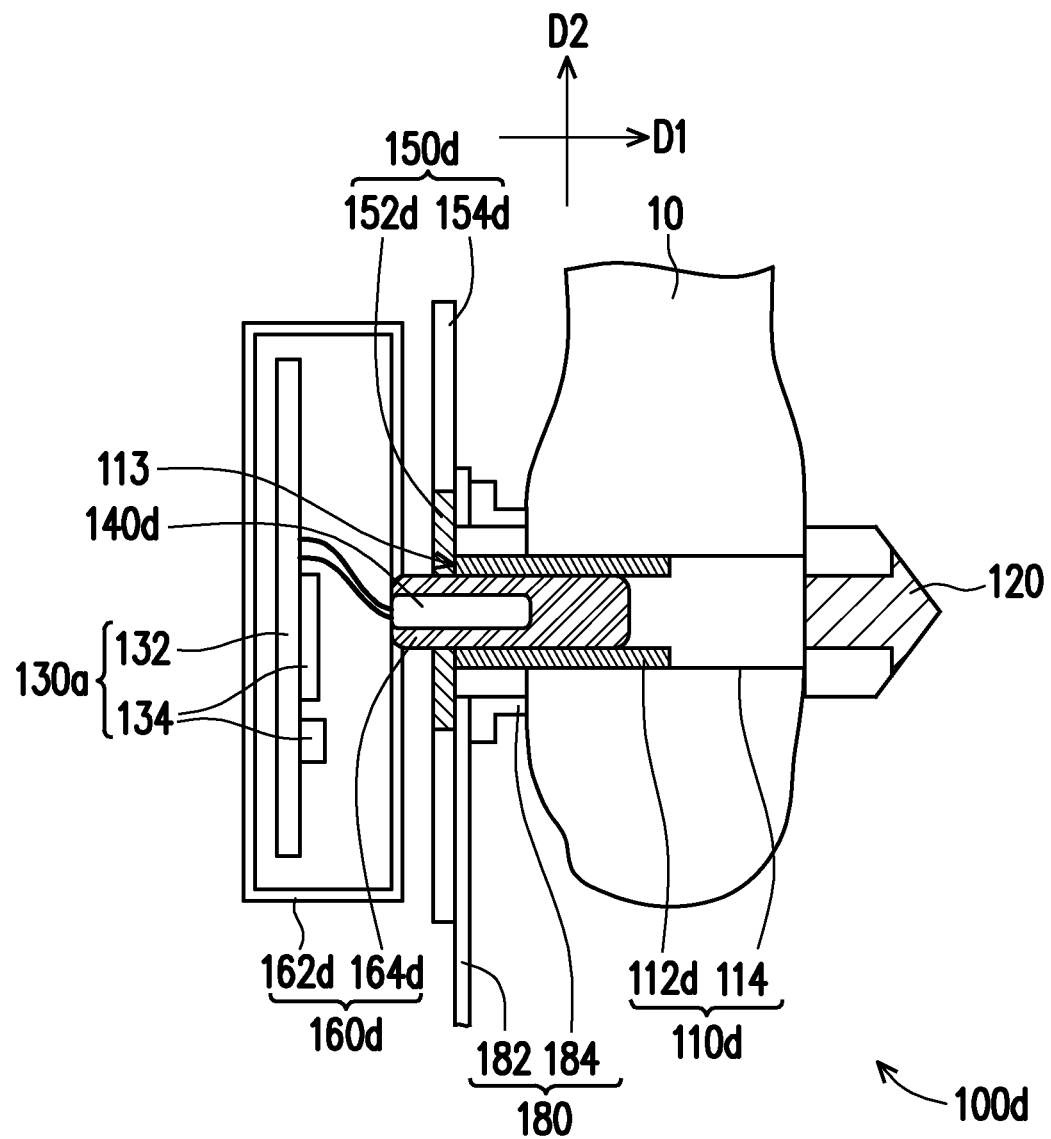
FIG. 4 is a cross-sectional view of an ear tag module penetrating an ear of another embodiment of the disclosure.

FIG. 4 is a cross-sectional view of an ear tag module penetrating an ear of another embodiment of the disclosure. Referring to FIG. 4 and FIG. 1C at the same time, an ear tag module 100d of the present embodiment is similar to the ear tag module 100a of FIG. 1C, and the difference between the two is that the ear tag module 100d of the present embodiment is not provided with the upper cover 150 and the lower cover 160a of FIG. 1C, but includes a sleeve member 150d and an accommodating housing 160d. The sleeve member 150d includes a first portion 152d and a second portion 154d, wherein the sleeve member 150d is connected to the edge of the other side 113 of a rod member 110d. More specifically, the sleeve member 150d is connected to a first housing portion 112d of the rod member 110d via the first portion 152d, wherein an extending direction D2 of the sleeve member 150d is perpendicular to an extending direction D1 of the rod member 110d. In particular, the thermal conductivity of the first portion 152d is greater than the thermal conductivity of the second portion 154d. The materials of the first portion 152d and the second portion 154d are both biocompatible, wherein the material of the first portion 152d is, for example, stainless steel, titanium, cobalt, or ceramic, and the material of the second portion 154d is, for example, thermoplastic urethane (TPU), but the disclosure is not limited thereto.

In an embodiment, the rod member 110d and the sleeve member 150d may be integrally formed by injection molding, or the sleeve member 150d and the label component 180 are integrated into one, but the disclosure is not limited thereto. The accommodating housing 160d includes a cover 162d and an assembly member 164d connected to the cover 162d, wherein the material of the assembly member 164d is a metal, for example, and has heat conduction capability. The circuit component 130a is located in the cover 162d, and a temperature sensor 140d is fixed in the assembly member 164d.

When the spike 120 penetrates the ear 10 and the accommodating housing 160d is removably assembled in the rod member 110d, the assembly member 164d enters the rod member 110d from the other side 113 of the rod member 110d and is in contact with the first housing portion 112d of the rod member 110d, and the temperature sensor 140d is located in the rod member 110d. At this time, the cover 162d of the accommodating housing 160d may bear the sleeve member 150d. The temperature sensor 140d located in the assembly member 164d via the rod member 110d may quickly and accurately detect the temperature of the ear 10 of the livestock via the heat transfer of the first housing portion 112d and the assembly member 164d. Here, when the spike 120 penetrates the ear 10, the rod member 110d passes through the fixing portion 184 of the label component 180, and the ear 10 is located between the spike 120 and the label component 180, but the disclosure is not limited thereto.

In the design of the ear tag module 100d of the present embodiment, since the temperature sensor 140d of the present embodiment is disposed in the assembly member 164d of the accommodating housing 160d, the accommodating housing 160d is removably assembled in the rod member 110d. Therefore, if the temperature sensor 140d disposed in the assembly member 164d or the circuit component 130a disposed in the cover 162d is damaged or malfunctioned, the user may easily replace or recycle the temperature sensor 140d or the circuit component 130a to troubleshoot. In addition, via the design that the accommodating housing 160d is removably assembled in the rod member 110d, livestock may be prevented from the pain caused by changing the ear tag.

Figure 5:
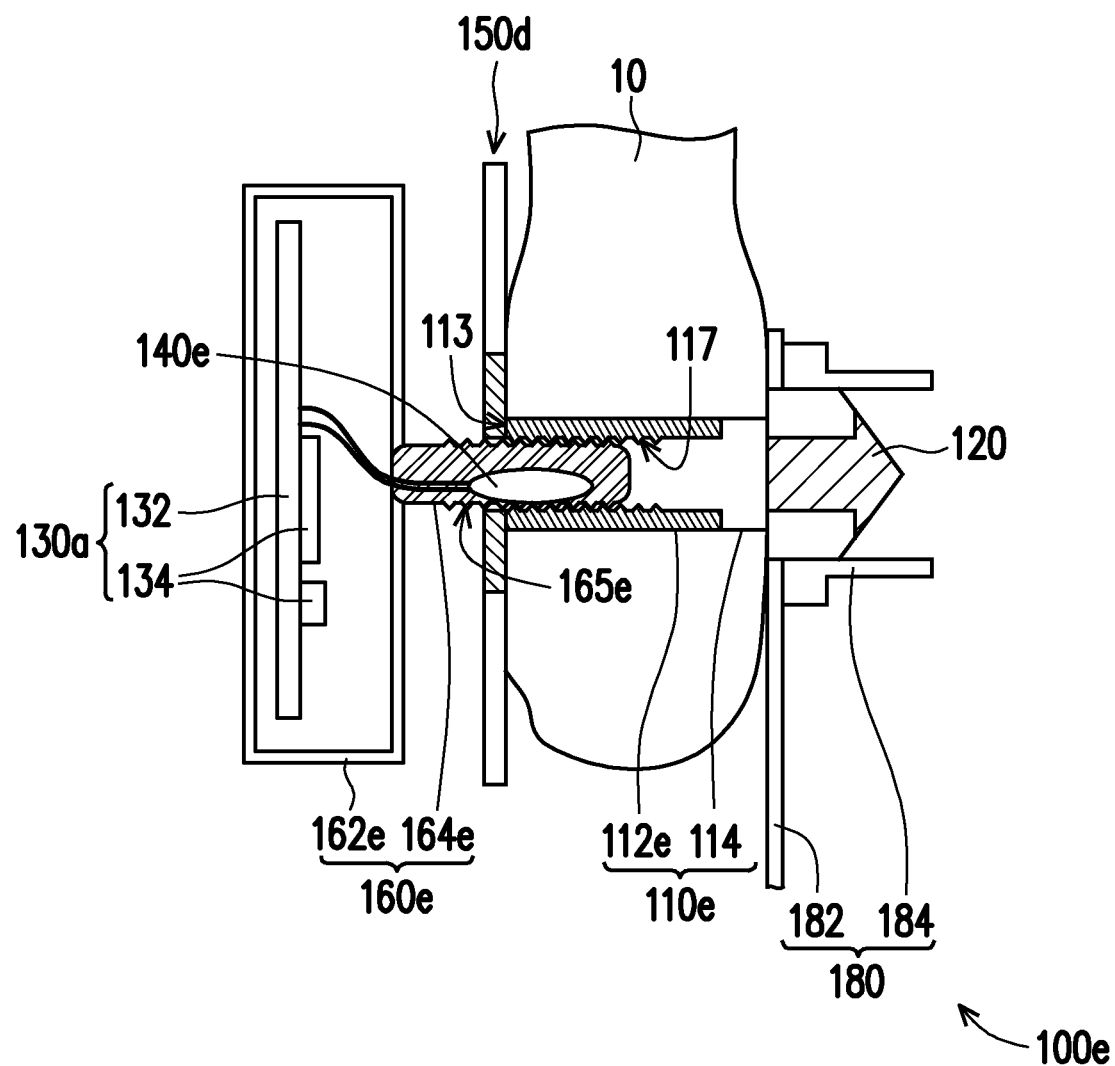
FIG. 5 is a cross-sectional view of an ear tag module penetrating an ear of another embodiment of the disclosure.

FIG. 5 is a cross-sectional view of an ear tag module penetrating an ear of another embodiment of the disclosure. Referring to FIG. 4 and FIG. 5 at the same time, an ear tag module 100e of the present embodiment is similar to the ear tag module 100d of FIG. 4, and the difference between the two is that an accommodating housing 160e of the present embodiment is screwed into a rod member 110e. In detail, one of an assembly member 164e and the rod member 110e has a threaded portion 117, and the other of the assembly member 164e and the rod member 110e has a screw portion 165e. When the spike 120 penetrates the ear 10, the assembly member 164e is screwed into the rod member 110e from the other side 113 of the rod member 110e via the threaded portion 117 and the screw portion 165e, so that a temperature sensor 140e is located in the rod member 110e. Here, the threaded portion 117 of the rod member 110e is disposed corresponding to a first housing portion 112e.

Since in the accommodating housing 160e, the temperature sensor 140e is located in the rod member 110e via screwing, if the temperature sensor 140e disposed in the assembly member 164e or the circuit component 130a disposed in a cover 162e is damaged or malfunctioned, the user may easily replace or recycle the temperature sensor 140e or the circuit component 130a to troubleshoot. In addition, via the design that the accommodating housing 160e is assembled in the rod member 110e via screwing, livestock may be prevented from the pain caused by changing the ear tag.

Based on the above, in the design of the ear tag module of the disclosure, the first housing portions of the rod member having high thermal conductivity are in direct contact with the ear, and the temperature sensor located in the rod member may more quickly and accurately detect the body temperature of livestock via the first housing portions. In other words, the ear tag module of the disclosure may provide instant feedback on the physiological state of livestock, and may achieve precise livestock farming (PLF).

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An ear tag module, comprising:
a rod member;
a spike disposed on one side of the rod member;
a circuit component disposed on another side of the rod member;
a temperature sensor electrically connected to the circuit component, wherein when the spike penetrates an ear, the ear is in contact with the rod member, and the temperature sensor is located in the rod member to detect a temperature of the ear and transmit at least one temperature sensing information to the circuit component, wherein the rod member comprises at least one first housing portion and a second housing portion connected to the at least one first housing portion, and a thermal conductivity of the at least one first housing portion is greater than a thermal conductivity of the second housing portion;
an upper cover;
a lower cover connected to the other side of the rod member and assembled with the upper cover to define an accommodating space, and the circuit component is located in the accommodating space; and
an auxiliary temperature sensor, wherein the lower cover has a viewing window, the circuit component comprises a circuit board, the auxiliary temperature sensor is disposed in the viewing window, one end of the auxiliary temperature sensor is attached in the viewing window of the lower cover, and the other end of the auxiliary temperature sensor is electrically connected to the circuit board.

2. The ear tag module of claim 1, wherein a material of the at least one first housing portion of the rod member and a material of the second housing portion are biocompatible, and the material of the at least one first housing portion comprises stainless steel, titanium, cobalt, or ceramic.

3. The ear tag module of claim 1, wherein the at least one first housing portion of the rod member has an accommodating opening, the temperature sensor is fixed at the accommodating opening, and when the spike penetrates the ear, the temperature sensor is in direct contact with the ear.

4. The ear tag module of claim 1, wherein the temperature sensor comprises a negative temperature coefficient sensor or a resistance temperature sensor or a thermocouple sensor, and the auxiliary temperature sensor is an infrared temperature sensor.

5. The ear tag module of claim 1, wherein the lower cover comprises a first portion and a second portion connected to the first portion, a thermal conductivity of the first portion is greater than a thermal conductivity of the second portion, and the circuit component comprises:
a thermoelectric component connected to the first portion of the lower cover;
a booster circuit electrically connected to the thermoelectric component;
a super capacitor electrically connected to the booster circuit;
a circuit board electrically connected to the booster circuit and the super capacitor; and
a battery electrically connected to the circuit board.

6. The ear tag module of claim 1, further comprising:
a label component comprising a label portion and a fixing portion connected to the label portion, wherein the spike passes through the fixing portion of the label component, and when the spike passes through the ear, the ear is located between the label component and the circuit component.

7. The ear tag module of claim 1, further comprising:
a label component comprising a label portion and a fixing portion connected to the label portion, wherein the rod member passes through the fixing portion of the label component, and when the spike penetrates the ear, the ear is located between the spike and the label component.

8. An ear tag module, comprising:
a rod member;
a spike disposed on one side of the rod member;
a circuit component disposed on another side of the rod member;
a temperature sensor electrically connected to the circuit component, wherein when the spike penetrates an ear, the ear is in contact with the rod member, and the temperature sensor is located in the rod member to detect a temperature of the ear and transmit at least one temperature sensing information to the circuit component;
a sleeve member connected to an edge of the other side of the rod member, wherein an extending direction of the sleeve member is perpendicular to an extending direction of the rod member; and
an accommodating housing comprising a cover and an assembly member connected to the cover, wherein the circuit component is located in the cover, the temperature sensor is fixed in the assembly member, a material of the assembly member comprises a metal, the sleeve member is located between the accommodating housing and the spike, and when the spike penetrates the ear, the assembly member is located in the rod member and in contact with the rod member, and the cover bears on the sleeve member.

9. The ear tag module of claim 8, wherein the accommodating housing is removably assembled in the rod member, and when the spike penetrates the ear, the assembly member enters the rod member from the other side of the rod member, so that the temperature sensor is located in the rod member.

10. The ear tag module of claim 8, wherein the accommodating housing is screwed into the rod member, one of the assembly member and the rod member has a threaded portion, and the other of the assembly member and the rod member has a screw portion, and when the spike penetrates the ear, the assembly member is screwed into the rod member from the other side of the rod member via the threaded portion and the screw portion, so that the temperature sensor is located in the rod member.

* * * * *